Dec. 7, 1937.　　　K. A. HARMON　　　2,101,392
ELECTRIC GENERATOR
Filed Nov. 19, 1936　　　2 Sheets-Sheet 1
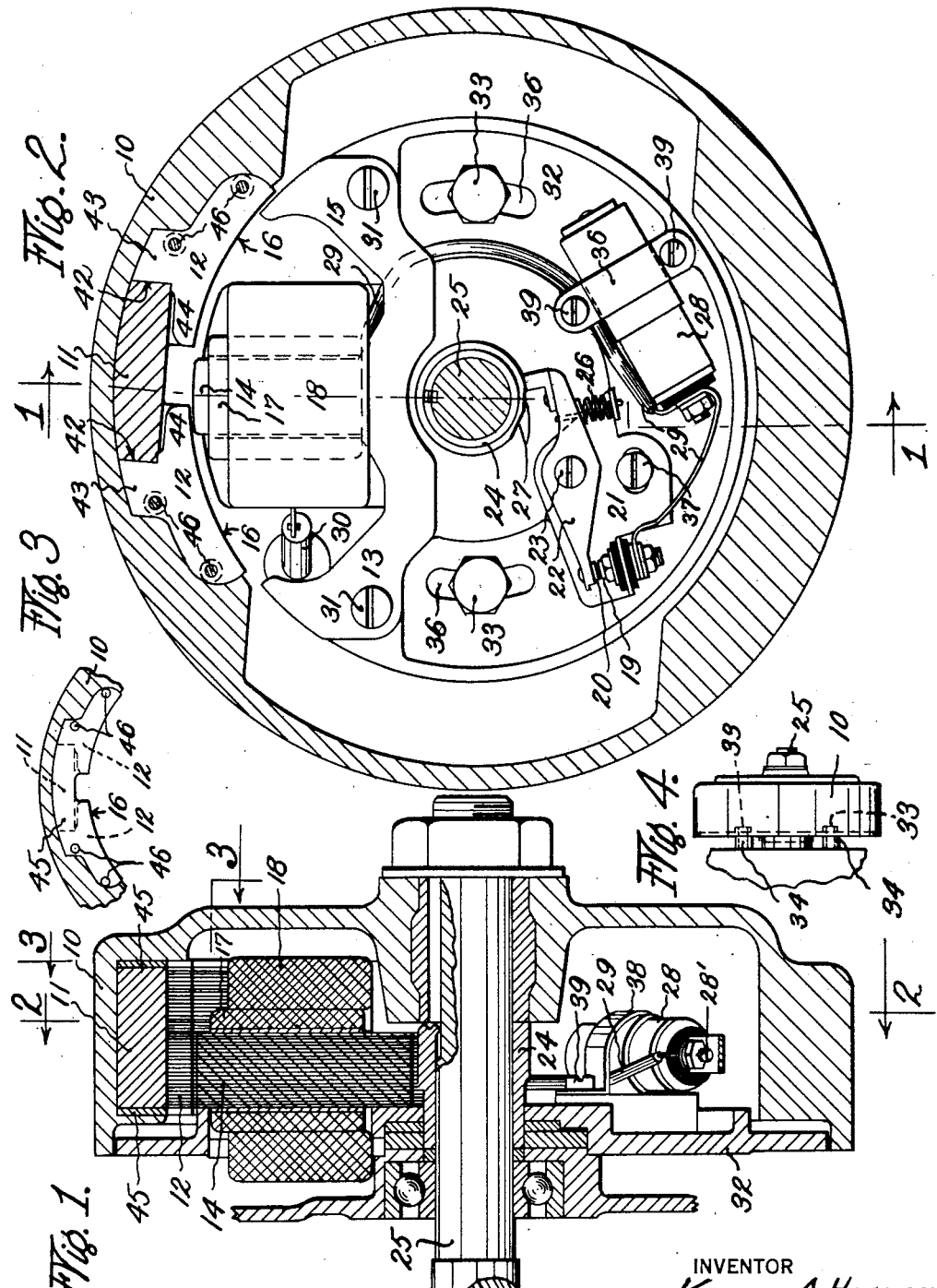
INVENTOR
KENNETH A. HARMON
BY
Chapin & Neal.
ATTORNEYS Dec. 7, 1937.  K. A. HARMON  2,101,392
ELECTRIC GENERATOR
Filed Nov. 19, 1936  2 Sheets-Sheet 2
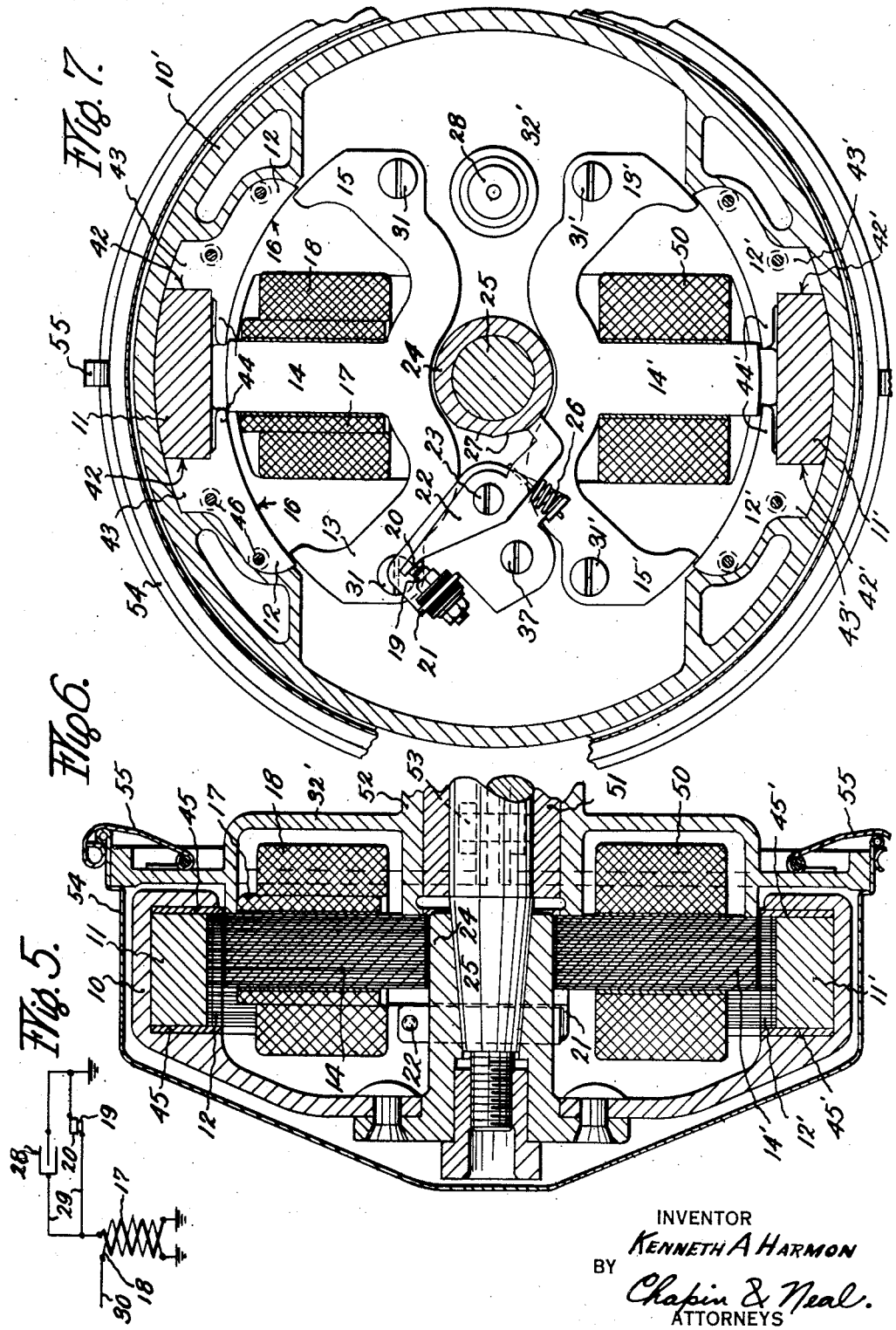
INVENTOR
*Kenneth A Harmon*
BY
*Chapin & Neal.*
ATTORNEYS Patented Dec. 7, 1937

2,101,392

UNITED STATES PATENT OFFICE 2,101,392

ELECTRIC GENERATOR

Kenneth A. Harmon, Longmeadow, Mass., assignor to Wico Electric Company, West Springfield, Mass., a corporation of Massachusetts Application November 19, 1936, Serial No. 111,576

13 Claims. (Cl. 171—209)

This invention relates to improvements in the magnetic field structure of electric generators. The improved structure is especially suitable for that type of intermittent electric generator, known in the trade as a flywheel magneto, but the invention is capable of other uses and is not limited to use as a generator of ignition current.

The conventional flywheel magneto includes a permanent magnet which with its pole shoes is carried by and rotates with the flywheel, and a stationary core structure carrying the generating coil or coils, with which structure the shoes cooperate during each revolution of the flywheel to make and break a magnet circuit through said core structure and the coil or coils carried thereby. The magnets heretofore used in such magnetos, are nearly circular in form and extend nearly entirely around the inner periphery of the flywheel. The polar ends of such magnets connect one with each of the two outer and non-adjacent faces of the pole shoes. Such magnets are relatively expensive because of the large amount of material needed and because of the necessity for shaping them, as by rolling, into their nearly circular form and for drilling them to receive necessary fastenings. They are necessarily heavy and occupy a large amount of space, whereby they add materially to the weight of the flywheel and also to its bulk, precluding the use of flywheels of light weight and of the very small diameters now so frequently used.

This invention has for its object the provision of an improved magnetic field structure which may be used, with important advantages, in place of the field structure above described, and for other purposes.

More particularly the invention has for an object the provision of an improved field structure which is compact and of light weight, and therefore capable of use in flywheels of very small diameter and light weight.

Another object of the invention is to provide a magnetic field structure including a permanent magnet and two pole shoes, which are circularly spaced about the axis of the flywheel, said shoes having two ends in close proximity and spaced apart by a relatively small arcuate distance and having the other two ends spaced apart by a relatively large arcuate distance, the magnet being of small dimensions and of high coercive force and extending over said small arcuate distance to interconnect two adjacent and confronting faces of the shoes.

Other objects will appear as the detailed description proceeds and will be pointed out in the appended claims.

The invention will be disclosed with reference to the accompanying drawings, in which:

Fig. 1 is a cross sectional view of a flywheel magneto embodying the invention;

Fig. 2 is a sectional elevational view thereof, taken on the line 2—2 of Fig. 1;

Fig. 3 is a fragmentary sectional view taken on the line 3—3 of Fig. 1;

Fig. 4 is a small scale bottom plan view of the magneto;

Fig. 5 is a wiring diagram illustrative of the electric circuits of the magneto; and Figs. 6 and 7 are views taken similarly to Figs. 1 and 2, respectively, and showing a modification.

Referring to these drawings and first to Figs. 1 and 2 thereof, in which the invention is shown embodied in a flywheel magneto, the latter includes a field structure carried by and rotating with the flywheel 10 and a stationary core structure carrying the necessary coils. The field structure comprises a permanent magnet 11 of very small dimensions and of high coercive force, herein shown in the form of a very short bar; and two laminated pole shoes 12, engaged one with each of the two polar ends of the magnet. The core structure is made up of laminations of magnetic material and has three legs 13, 14 and 15, integrally united at their inner ends and extending more or less radially with their outer ends angularly spaced and curved to cooperate successively with the curved polar faces 16 of each of the pole shoes 12 on rotation of the field structure. The central leg of the core structure carries primary and secondary coils 17 and 18, respectively.

The magnetic circuit is of an old and well known type and is characterized in that reversals of flux from the magnetic source 11 through the coil-carrying core 14 are effected on relative rotation of the field and core structures. Assuming that the flywheel 10 is rotating in the direction of the arrow shown in Fig. 2, when the leading pole shoe 12 overlaps the central leg or core 14, the trailing shoe 12 overlaps the leg 13 and flux from the magnet 11 flows from the trailing shoe 12 down leg 13 and up core 14 to the leading shoe 12. Subsequently, the leading shoe overlaps the leg 15 and the trailing shoe overlaps the core 14, whereupon flux from magnet 11 flows from the trailing shoe down core 14 and up leg 15 to the leading shoe 12. The magnet is thus bridged across the ends of the core 14 first through one and then through the other of the outer legs 13 and 15 of the core structure.

The electric circuits of the magneto are also old and well known. The primary coil 17, as indicated in Fig. 5, is arranged in a circuit which can be opened and closed by disengagement and engagement, respectively, of the cooperating breaker points 19 and 20. The point 19 is fixed to and insulated from a stationary supporting bracket 21. The point 20 is carried by one end of a lever 22, pivoted intermediate its ends on a stud 23 and having its other end engaged by a cam 24 fixed to the crankshaft 25 which carries flywheel 10. A spring 26 holds the lever engaged with the cam and tends to engage or close the breaker points. The cam is cylindrical except for the "flats" 27. The cylindrical portion of the cam acts on lever 22 to hold the breaker points disengaged or open. When the lever rides onto the "flats" 27 the points close and very shortly after open again. The arrangement is such that the breaker points close shortly after the magnetic circuit is established in the first-named direction through core 14. The points open when the flywheel is about in the position shown in Fig. 2 so that the release of flux, established in one direction through the core 14, is immediately followed by the building up of flux in an opposite direction through the core.

A condenser, such as 28, is bridged across the breaker points 19 and 20. As shown in Fig. 5, one terminal of coil 17 is grounded and the other terminal is connected by a wire 29 to the insulated terminal of the condenser and to the insulated breaker point 19. The other terminal of condenser 28 and the breaker point 20 is grounded. The secondary coil 18 has one terminal grounded and the other terminal is connected by a high tension wire 30 to the spark plug of the engine.

The core structure is suitably secured, as by cap screws 31, to a circular plate 32 which in turn is secured by cap screws 33 to parts 34 of the crankcase of the engine as indicated in Fig. 4. The cap screws pass through slots 36 in plate 32 and enable angular adjustment of the plate relatively to shaft 25 for timing purposes. The plate 21 of breaker point mechanism is secured by screw 37 to plate 32. The condenser 28 is also secured to the plate by means of a strap 38 and screws 39.

The novel and important features of this invention lie primarily in the magnetic field structure. Instead of the large and nearly circular permanent magnets, heretofore used, I employ a magnet of very small dimensions, herein shown in substantially the form of a very short bar. This magnet is made of special alloy steel having very high coercive force. The necessary coercive force heretofore obtained by great length of the magnet, is in this case obtained not by length but by the quality of the steel used for the magnet. And the quality of the steel is so unusually high that a very short length of it will suffice. For example, the length of the magnet need be no more than one and one-half inches, as is the case in the illustrated magneto. With this extraordinarily short bar, I am enabled to employ an arrangement which has not heretofore been possible in a flywheel magneto or generator. That is, the polar ends of the magnet are engaged with adjacent and confronting seats, such as 42, formed one on each shoe, as distinguished from the prior art arrangement, wherein the polar ends of the magnets were engaged one with each of the non-adjacent and non-confronting faces of the shoes. It should be borne in mind that the cylindrical surfaces 16 of the pole shoes must be very closely spaced. The circular spacing of these shoes is generally made less than the width or arcuate extent of the curved outer end of core 14. Thus, the distance between the two surfaces 16 is less than the length of the magnet and to enable this close spacing of the shoes, even with a magnet of short length, it is usually necessary to have the magnet partially overlap each shoe. To permit the use of the overlapping arrangement, the magnet 11 is spaced outwardly in a radial direction beyond the surfaces 16 and thus radially offset. Also, the faces 42 which form the magnet seats are provided on outward extensions 43 which are directed more or less radially,—one from the body of each shoe 12. The portions 44 of the shoes which partially overlap the magnet are kept out of contact with the magnet, as far as possible, being radially spaced from the magnet, as shown, for the purpose of reducing leakage of flux. While the overlapping of the magnet and shoes is conducive to diversion of flux through leakage paths, the magnet herein used has such great coercive force that more than the needed amount of flux is available and some of it may be diverted in leakage paths without detrimental effect on the operation of the magneto.

The magnet 11 and its pole shoes are preferably fixed to the flywheel by imbedding the same therein during the operation of casting the flywheel. The magnet which may be cast in the form shown, has its polar ends finished as by grinding, to closely fit the seats 42 on the shoes 12. The shoes and magnet assembled in the relation shown, are suitably bound together. This may be done by using two thin plates 45 of non-magnetic material which are arranged one on each side of the assembly and which serve to tie together the two shoes with the magnet held therebetween,—the plates being each suitably secured as by rivets 46 to each shoe 12. The assembly is then inserted in a mold and the non-magnetic material such as aluminum, which forms the flywheel, is poured about it.

The invention is not confined to use in magnetos and may be used in other ways for the generation of electricity. For example, in Figs. 6 and 7, I have shown an arrangement wherein the same field structure cooperates with a suitable core structure which carries a coil 50, in which current may be induced for lighting purposes. This core structure may be like that used for the magneto and has been so indicated in Fig. 7. As shown, the second core structure is a duplicate of the first and corresponding parts have been designated by the same reference numerals with the addition of a prime. It is desirable also to duplicate the field structure and parts of the second field structure which correspond with the first have been designated by the same reference numerals with the addition of a prime. The two field structures cooperate successively with the second core structure and cause the E. M. F. induced in coil 50 to be more uniform. Naturally, the two field structures likewise act on the first core structure and cause current to be induced in the coil 18 twice during each revolution of the flywheel 10'. Only one of these induced currents is utilized for ignition purposes. The other current produced by the action of magnet 11', occurs while the breaker points are maintained open by the cylindrical portion of cam 24 and is not as great as the one used for ignition purposes and does no harm in the ignition system.

As to the details of the structure shown in Figs. 6 and 7, these are not of any particular importance to the invention. As will be clear from the drawings, it has been necessary to relocate the breaker point mechanism and condenser to lie on diametrically opposite sides of shaft 25 and between the two core structures. The condenser is suitably fixed to plate 32' with its axis at right angles thereto instead of parallel thereto as formerly. The support 21 for the breaker point mechanism has been moved axially outward, as indicated in Fig. 7, so that the lever 22 may move freely without interference with either core structure. The flywheel 10' and supporting plate 32' are somewhat different in design but not in purpose. The plate 32' is mounted for angular adjustment on the hub 51 of the engine crankcase. Plate 32' has a split hub 52 telescoped over hub 51 and capable of being clamped to the latter by a bolt 53. The cam 24 is formed as an integral part of the hub of flywheel 10'. The entire apparatus may be enclosed, as shown in Fig. 6, by an approximately bowl-shaped casing 54 of thin metal,—this casing being held to plate 32' by a plurality of easily releasable fasteners 55.

The improved magnetic field structure has many advantages. It enables substantial savings in manufacturing costs to be effected. All machining and shaping operations on the magnets are avoided with the exception of facing the polar ends of the magnets. This facing operation may be effected inexpensively by arranging a large number of the magnet bars in one fixture and grinding them all at one time. The long circular magnets, formerly used, required shaping in circular form and drilling in addition to the facing of their polar ends. Also, the cost of the material is less. While the cost per pound of the special steel used for the magnets 11 is much greater than that of the ordinary magnet steel, used heretofore for the circular magnets, much less of the material is used for each magnet. Actually, the magnets of this invention can be made for less than half the price of the circular magnets formerly used and a total reduction in cost of the magneto or generator of at least ten per cent can be effected by the use of my improved field structure. This structure is not only cheaper but it is more efficient than the former flywheel magneto structures. An increase in efficiency is secured by the features which enable the savings in cost. A further advantage is that the field structure enables reductions in weight and also reductions in flywheel diameter to be effected. In the flywheel magnetos of the prior art, coercive force was secured by length of the magnets and great length and therefore considerable weight were necessary to secure a sufficiently high coercive force. Here, the magnet has been reduced to such small dimensions that its weight is nearly negligible. As a matter of fact, in the present case where aluminum is used for the flywheel, it has been necessary to build up the weight to some extent by the addition of zinc. Irrespective of weight limitations, the field structure is small and compact and therefore occupies such small space that it can be used in flywheels of small diameter where the former long, curved magnets could not be used because of lack of space in which to house them. The space and weight saving features are of prime importance because of the present trend to the use of light weight flywheels of small diameter. For example, the illustrated flywheel is only six and one-half inches in diameter and weighs between three and four pounds, and the invention would enable the flywheel to be made of still less weight and of still smaller diameter if necessary or desired.

Thus, I have provided an improved field structure for electric generators or flywheel magnetos, which enables important savings in manufacturing cost to be effected and important reductions in size and weight of the moving parts to be effected and which at the same time yields increased efficiency in operation.

What I claim is:

1. In an electric generator, a field structure including a permanent magnet and a pair of pole shoes, a core structure, a generating coil carried by the core structure, means for rotating one of said structures relatively to the other, said shoes each having a curved portion for cooperation with the core structure on relative rotation of said structures and a seat for one polar end of the magnet, said shoes being circularly spaced relatively to the axis of said rotation, said seats located in adjacent relation and spaced apart circularly relative to said axis by a distance greater than that by which the adjacent ends of said curved portions are spaced apart, said magnet extending between said seats and having its polar ends engaged one with each of said seats.

2. In an electric generator, a field structure including a permanent magnet and a pair of pole shoes, a core structure, a generating coil carried by the core structure, means for rotating one of said structures relatively to the other, said shoes each having a curved portion for cooperation with the core structure on relative rotation of said structures and a seat for one polar end of the magnet, said shoes being circularly spaced relatively to the axis of said rotation, said seats located in adjacent relation and spaced apart circularly relative to said axis by a distance greater than that by which the adjacent ends of said curved portions are spaced apart and less than that by which the non-adjacent ends of said curved portions are spaced apart, said magnet extending between said seats and having its polar ends engaged one with each of said seats.

3. In an electric generator, a field structure including a permanent magnet in the form of a short bar having high coercive force and a pair of pole shoes, a core structure with which said shoes cooperate on relative rotation of said structures, a generating coil carried by the core structure, and means for effecting said relative rotation, said shoes having confronting faces one on each, said faces being circularly spaced about the axis of said rotation and said magnet extending between said faces and having its polar ends engaged one with each thereof, said shoes having portions curved for cooperation with the core structure and the adjacent ends of such portions being spaced apart by a distance less than that by which said seats are spaced, whereby said magnet partially overlaps the shoes.

4. In an electric generator, a field structure including a permanent magnet in the form of a short bar having high coercive force and a pair of pole shoes, a core structure with which said shoes cooperate on relative rotation of said structures, a generating coil carried by the core structure, and means for effecting said relative rotation, said shoes having confronting faces one on each, said faces being circularly spaced about the axis of said rotation and said magnet extending between said faces and having its polar ends engaged one with each thereof, said shoes having portions curved for cooperation with the core structure and the adjacent ends of such portions being circularly spaced apart by a distance less than that by which said seats are spaced, whereby said magnet partially overlaps the shoes, the overlapping portions of said shoes for the major portion of their areas being radially spaced from and out of contact with said magnet.

5. In combination, a flywheel, a core structure of magnetic material stationarily mounted inside the flywheel, a generating coil carried by the core structure, a pair of pole shoes fixed to the flywheel in cooperative relation with said core structure, and a permanent magnet in the form of a short bar having high coercive force, said shoes having curved surfaces coaxial with the flywheel and circularly spaced one from the other about the axis of rotation of the flywheel, said shoes each having a magnet seat and said seats being disposed one adjacent the other in confronting relation and circularly spaced one from the other about said axis, said magnet extending between said seats and having its polar ends engaged one with each.

6. In combination, a flywheel, a core structure of magnetic material stationarily mounted inside the flywheel, a generating coil carried by the core structure, a pair of pole shoes fixed to the flywheel in cooperative relation with said core structure, and a permanent magnet in the form of a short bar having high coercive force, said shoes having curved surfaces coaxial with the flywheel and circularly spaced one from the other about the axis of rotation of the flywheel, said shoes each having a magnet seat and said seats being disposed one adjacent the other and circularly spaced one from the other about said axis by a distance greater than that between the adjacent ends of said surfaces, said magnet extending between said seats and having its polar ends engaged one with each.

7. In combination, a flywheel, a core structure of magnetic material stationarily mounted inside the flywheel, a generating coil carried by the core structure, a pair of pole shoes fixed to the flywheel in cooperative relation with said core structure, and a permanent magnet in the form of a short bar having high coercive force, said shoes having curved surfaces coaxial with the flywheel and circularly spaced one from the other about the axis of rotation of the flywheel, said shoes each having a magnet seat and said seats being disposed one adjacent the other and circularly spaced one from the other about said axis by a distance greater than that between the adjacent ends of said surfaces and less than that between the non-adjacent ends of said surfaces, said magnet extending between said seats and having its polar ends engaged one with each.

8. In combination, a flywheel, a core structure of magnetic material stationarily mounted inside the flywheel, a generating coil carried by the core structure, a pair of pole shoes fixed to the flywheel in coperative relation with said core structure, and a permanent magnet in the form of a short bar having high coercive force, said shoes having curved surfaces coaxial with the flywheel and circularly spaced one from the other about the axis of rotation of the flywheel, said shoes each having a magnet seat and said seats being disposed one adjacent the other in confronting relation and circularly spaced one from the other about said axis by a distance greater than that between the adjacent ends of said surfaces, said magnet extending between said seats and having its polar ends engaged one with each whereby the adjacent ends partially overlap the magnet, said overlapping ends being radially spaced from and out of contact with the magnet over substantially their entire area.

9. In combination, a flywheel, a core structure of magnetic material stationarily mounted inside the flywheel, a generating coil carried by the core structure, a pair of pole shoes fixed to the flywheel in cooperative relation with said core structure, and a permanent magnet in the form of a short bar having high coercive force, said shoes having curved surfaces coaxial with the flywheel and circularly spaced one from the other about the axis of rotation of the flywheel, the arcuate length of each shoe being approximately equal to the length of said magnet and the spacing between adjacent ends of the shoes being less than the length of the magnet, said magnet being radially offset from said surfaces and extending between the shoes in partially overlapped relation therewith.

10. In combination, a flywheel, a core structure of magnetic material stationarily mounted inside the flywheel, a generating coil carried by the core structure, a pair of pole shoes fixed to the flywheel in cooperative relation with said core structure, and a permanent magnet in the form of a short bar having high coercive force, said shoes having curved surfaces coaxial with the flywheel and circularly spaced one from the other about the axis of rotation of the flywheel, said shoes each having an extension directed outwardly away from said surfaces toward the outer periphery of the flywheel, said extensions being bridged by said magnet and the confronting faces of said extensions being engaged one with each polar end of said magnet, the circular spacing between said faces being greater than the corresponding spacing between the adjacent ends of said surfaces.

11. In combination, a flywheel, a core structure of magnetic material stationarily mounted inside the flywheel, a generating coil carried by the core structure, a pair of pole shoes fixed to the flywheel and cooperating with the core structure, said shoes having an unsymmetrical angular spacing about the axis of the flywheel with two ends of the shoes separated by a much smaller angle than that by which the other two ends are separated, and a permanent magnet of short length and high coervice force bridging across the smaller angle and magnetically interconnecting said shoes.

12. In combination, a flywheel, a core structure of magnetic material stationarily mounted inside the flywheel, a pair of pole shoes fixed to the flywheel, said shoes having an unsymmetrical angular spacing about the axis of the flywheel with two ends of the shoes separated by a much smaller angle than that by which the other two ends are separated, a permanent magnet of short length and high coervice force bridging across the smaller angle and magnetically interconnecting said shoes, said core structure having three legs magnetically connected together at one end and having their other ends formed with faces to cooperate with said shoes during rotation of the flywheel, and a generating coil on the central leg of said structure, said shoes operable during such rotation to bridge the polar ends of the magnet through the central coil-carrying leg first through one of the outer legs and then through the other, whereby a magnetic circuit is created through the coil first in one and then in an opposite direction.

13. In combination, a flywheel, a core structure of magnetic material stationarily mounted inside the flywheel, a pair of pole shoes fixed to the flywheel, said shoes having an unsymmetrical angular spacing about the axis of the flywheel with two ends of the shoes separated by a much smaller angle than that by which the other two ends are separated, a permanent magnet of short length and high coercive force bridging across the smaller angle and magnetically interconnecting said shoes, said core structure having three legs magnetically connected together at one end and having their other ends angularly spaced, said shoes having polar faces cooperating successively during rotation of the flywheel with the last-named ends of the core structure to create reversals of flux from said magnet through the central and coil-carrying leg, the length of said magnet being comparable to the arcuate length of each of said polar faces.

KENNETH A. HARMON.